(12) United States Patent
Moskal et al.

(10) Patent No.: US 8,949,771 B2
(45) Date of Patent: Feb. 3, 2015

(54) MEDIA FILES INCLUDING PROGRAMMING CODE AND DESCRIPTION

(75) Inventors: Michal J. Moskal, Seattle, WA (US); Jonathan Peli Paul de Halleux, Seattle, WA (US); Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 13/165,814

(22) Filed: Jun. 22, 2011

(65) Prior Publication Data

US 2012/0331438 A1 Dec. 27, 2012

(51) Int. Cl.
G06F 9/44 (2006.01)
G06F 9/445 (2006.01)

(52) U.S. Cl.
CPC ... G06F 8/61 (2013.01); G06F 8/73 (2013.01)
USPC .......................... 717/103; 717/100; 717/123

(58) Field of Classification Search
CPC ........................................................ G06F 8/20
USPC ............... 717/100–109, 137, 151, 173–175; 709/201, 220, 223, 224
See application file for complete search history.

(56) References Cited

U.S. PATENT DOCUMENTS

| | | | |
|---|---|---|---|
| 6,697,498 B2 | 2/2004 | Kawaguchi et al. | |
| 6,707,927 B1 | 3/2004 | Kita et al. | |
| 6,748,362 B1 | 6/2004 | Meyer et al. | |
| 7,184,156 B2* | 2/2007 | Tateyama | 358/1.15 |
| 7,188,186 B1* | 3/2007 | Meyer et al. | 709/231 |
| 7,313,248 B2 | 12/2007 | Tonisson | |
| 7,636,172 B2* | 12/2009 | Akiyoshi et al. | 358/1.13 |
| 8,479,154 B1* | 7/2013 | Friedman | 717/106 |
| 8,479,174 B2* | 7/2013 | Chiriac | 717/136 |
| 2004/0199896 A1* | 10/2004 | Goodman et al. | 717/100 |
| 2007/0157096 A1* | 7/2007 | Keren et al. | 715/760 |
| 2009/0003701 A1 | 1/2009 | Rekhi | |
| 2011/0126179 A1* | 5/2011 | Hartman et al. | 717/140 |
| 2011/0202905 A1* | 8/2011 | Mahajan | 717/140 |
| 2011/0246968 A1* | 10/2011 | Zhang et al. | 717/125 |

OTHER PUBLICATIONS

Nichols et al., Improving Automatic Interface Generation with Smart Templates, ACM, Jan. 13-16, 2004, pp. 286-288.*
Bo et al., MobileTest: A Tool Supporting Automatic Black Box Test for Software on Smart Mobile Devices, IEEE, 2007, pp. 7 page.*
Sjolund et al., Smartphone Views: Building Multi-device Distributed User Interfaces, Springer, 2004, pp. 507-511.*
Jalab, et al., "New Design for Information Hiding with in Steganography Using Distortion Techniques", Retrieved at <<http://www.ijetch.org/papers/103-T463.pdf>>, International Journal of Engineering and Technology, vol. 2 No. 1, Feb. 2010, pp. 72-77.

(Continued)

Primary Examiner — Satish Rampuria
(74) Attorney, Agent, or Firm — Sandy Swain; Judy Yee; Micky Minhas (57) ABSTRACT

The description relates to media files and more particularly to media files that include a program and a human-understandable description of the program. One example can receive executable code. This example can determine a functionality provided by the executable code. The example can also create a media file that stores the executable code and presents the functionality in a human-understandable form.

20 Claims, 7 Drawing Sheets

(56) References Cited

OTHER PUBLICATIONS

Kumar, et al., "A multilayered architecture for hiding executable files in 3D images", Retrieved at http://www.indjst.org/archive/vol.3.issue.4/apr10mohankumar-9.pdf>>, Indian Journal of Science and Technology, vol. 3 No. 4, Apr. 2010, pp. 402-407.

Gomez, et al., "Using digital images to spread executable code on Internet", Retrieved at http://homepage.cem.itesm.mx/rogomez/Publicaciones/i2cs06.pdf>>, Innovative Internet Computing Systems—IICS, 2010, pp. 13.

Kawaguchi, et al., "Principle and applications of BPCS-Steganography", Retrieved at <<http://citeseerx.ist.psu.edu/viewdoc/download?doi=10.1.1.17.9478&rep=rep1&type=pdf>>, SPIE's International Symposium on Voice, Video, and Data Communications, 1998, pp. 10.

\* cited by examiner

MEDIA FILES INCLUDING PROGRAMMING CODE AND DESCRIPTION

BACKGROUND

Software programs, such as executable programs are often distributed in cryptic file formats that are meant for consumption by the execution environment in which they are meant to run. Such file formats do not lend themselves to inspection by the human beings which are ultimately the end users. As a result, it is often difficult for the end user to understand the function of such programs by inspecting the program code. As a result the user may load and run a program or transfer the program from one machine to another, or to another end user, without an appreciation of what the program does.

SUMMARY

The description relates to media files and more particularly to media files that include a program and a human-understandable description of the program. One described example can receive a program in the form of executable code. This example can determine a functionality provided by the executable code. The example can also create a media file that stores the executable code and presents the functionality in a human-understandable form.

Another implementation can obtain an image that includes executable code and an abstraction of a functionality offered by the executable code such that when the image is displayed the abstraction is presented over the executable code. The implementation can identify the executable code from the image.

Still another implementation can receive a media file that includes a program and a representation of functionality offered by the program. This implementation can separate the program and the representation. The implementation can analyze the program to determine the functionality of the program. The implementation can further determine whether the representation of the functionality matches the determined functionality.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

The present concepts relate to media files and to embedding programs, such as executable programs in the media files. Further, the present concepts can offer an ability to determine a functionality offered by the program. This functionality can be included in the media file in a human-understandable description or representation so that a user can decide whether or not to run the program. Since these media files can include the program and the description, the media files may be hereinafter termed PAD media files (Program And Description). The PAD media files can be readily transferrable from machine-to-machine and/or from user-to-user in a manner similar to existing media files.

Stated another way, embedding a program into a PAD media file, such as a picture, can allow easy sharing and copying (media library, emails, etc). Listing the description of the program on the PAD media file as text or graphics can provide the user with an immediate visual idea of the security and privacy implications of running the program. Making the picture synthesis reversible can allow automatic detection if the PAD media file was tampered with or is otherwise an inaccurate description of the program. For instance, the automatic detection can identify a scenario where the description does not indicate that the program accesses a list of contacts or passwords when in fact the program actually will access the list.

Figure 1:
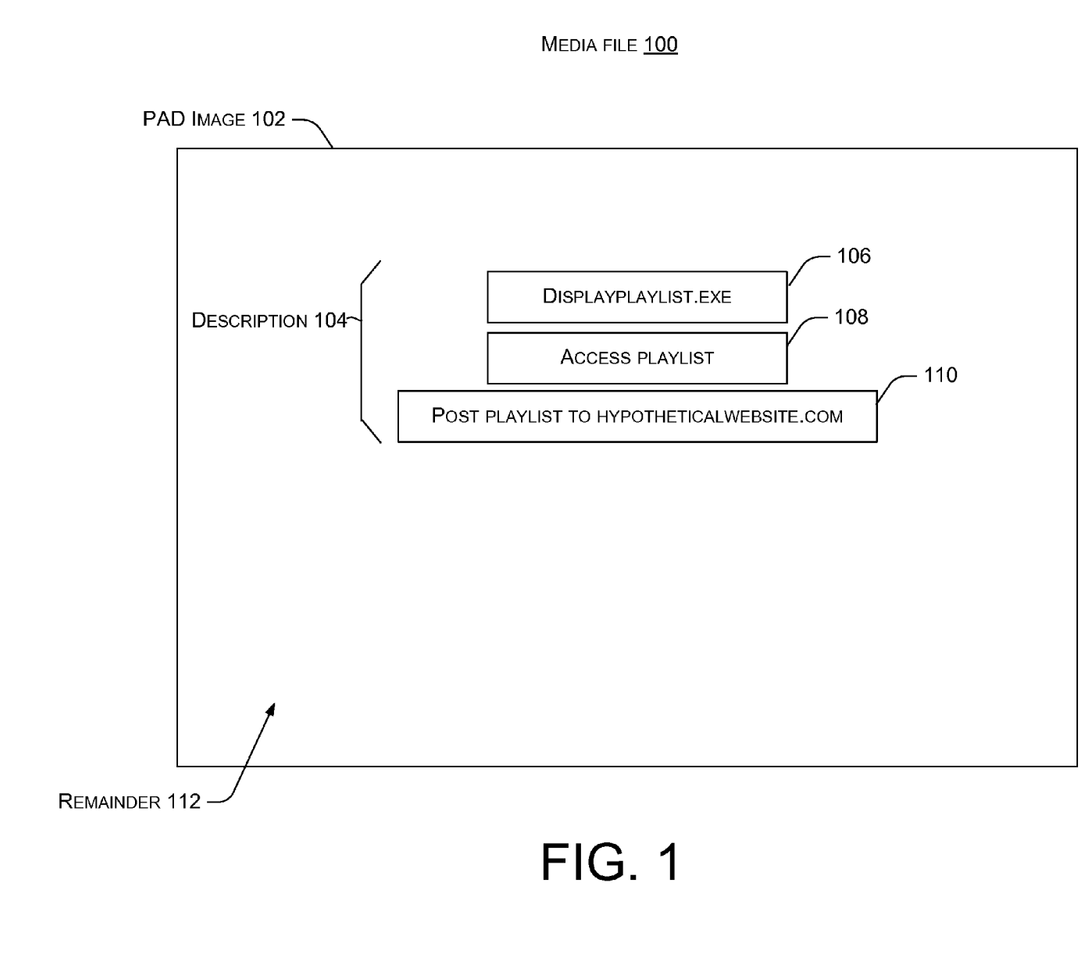
FIG. 1 shows a representation of an example of a Program And Description "PAD" media file in accordance with some implementations of the present concepts.

For purposes of explanation consider introductory FIG. 1, which shows an example of a PAD media file 100. In this example, the PAD media file is manifest as an image file or image (PAD image) 102. Other PAD media files can be manifest as sound files and/or video files. In this case, PAD image 102 includes code (e.g., computer-readable instructions) of an executable program and a description 104 of a functionality performed by the executable program. The description 104 can be thought of as an abstraction or summarization of the program's functionality and/or capabilities accessed by the program that is presented in a human-understandable form. In this case, the description is provided as graphical text boxes 106, 108, and 110. The description can be manifest in any human-understandable form, such as text, graphics, icons, among others, and/or combinations thereof.

The executable code can be contained in the PAD image 102 but need not be discernable to the user. In this example, the executable code can be conveyed in some or all of a remainder 112 of the PAD image. This aspect is described in more detail below. Briefly, an image can have unused or underutilized bytes that can be used to convey the executable program with little or no outwardly apparent affect on the PAD image 102.

The description 104 can provide information to the user that allows the user to make a more informed decision whether to run the program encoded in the remainder 112. For instance, in this example the user can decide whether he/she wants his/her playlists displayed on a website for others to see. If so, the user can run the program. If not, the user can decide not to run the program. Further PAD media file concepts are described below.

Example Technique for Generating Pad Images

Figure 2:
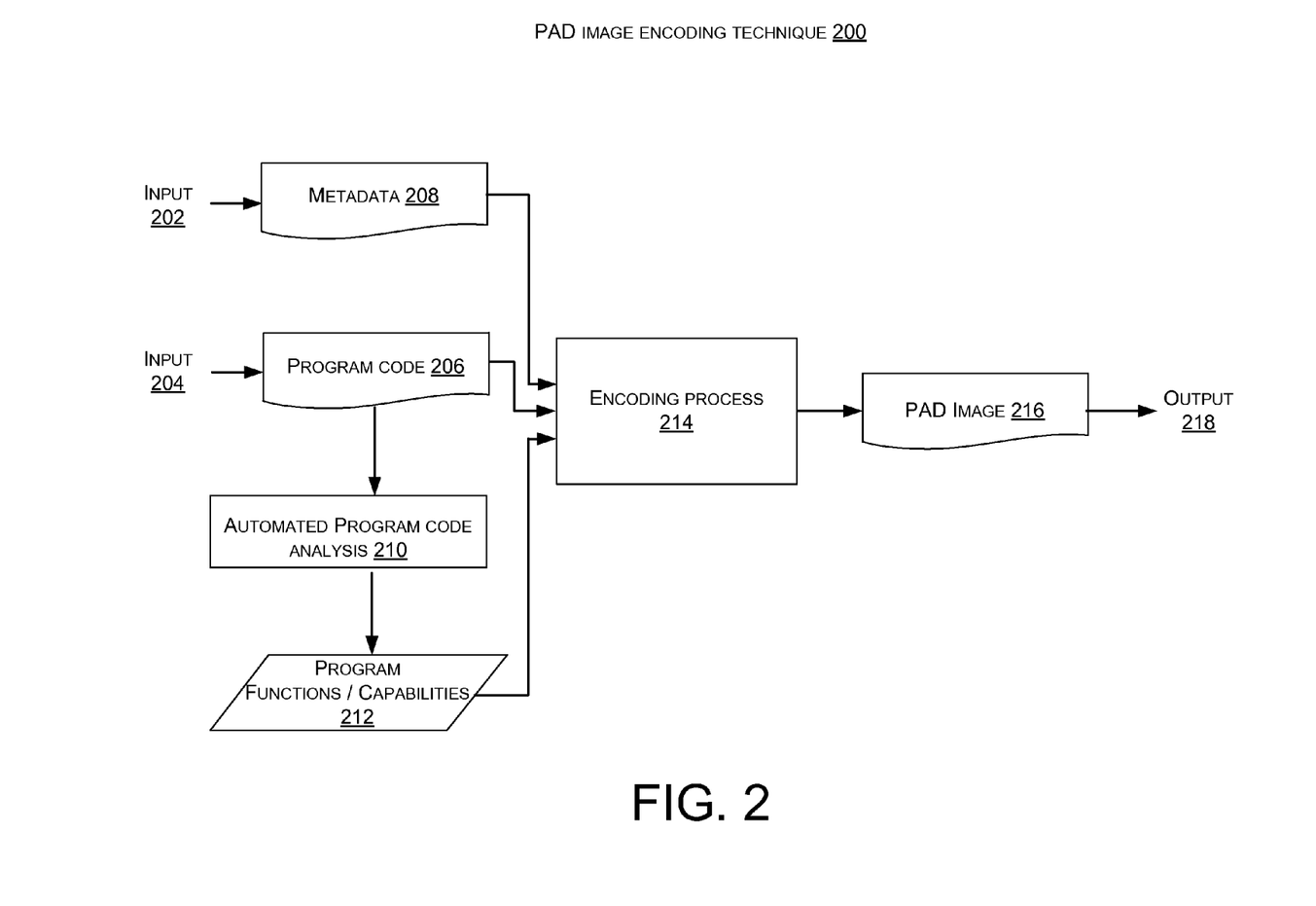
FIGS. 2-4 show flowcharts of examples of PAD media file techniques in accordance with some implementations of the present concepts.

FIG. 2 presents an example PAD image encoding technique 200. This example begins with two inputs 202 and 204. Input 204 relates to program code 206. Input 202 relates to metadata 208 (and/or other non-code data) that is associated with the program code 206. For instance, the metadata may relate to program name, or other information. Other implementations may use only the program code 206 as input without receiving any metadata.

In some cases, the user can specify the program code 206 for input 204. For instance, the user may 'point' to a location where the program is stored. In other cases, the user may create the program code. For instance, the user could write the program code. Some implementations can generate a graphical user interface (GUI) from which the user can define the program code.

At 210, the technique can automatically analyze the program code. This analysis can determine the program's functions and/or capabilities 212. For instance, the functions/capabilities can represent external interactions of the program code. For example, the automated program code analysis 210 can determine whether the program code requires access to location information (such as may be available on a smart phone that executes the program code 206). In another example, the automated program code analysis 210 can determine whether the program code will access the user's identity (available on a smart phone), the user's media library, or web services such as social media sites, and/or other local or remote services, among others. Viewed from another perspective, one way of determining the capabilities is checking for all API calls in the program. Another way of determining the capabilities can be to use data-flow analysis to detect information flows from some APIs (like location) to others (like posting to a website).

The program code 206, metadata 208, and/or program functions/capabilities 212 can be used in an encoding process at 214. The encoding process can generate PAD image 216 from the program code 206, metadata 208, and/or program functions/capabilities 212. The encoding process can utilize the information present in the program code, metadata, and/or program functions/capabilities, all possibly being represented as bit streams. The encoding process can turn the information present in the program code, metadata and/or program functions/capabilities into a new bit stream that represents an image, such that all of the bits present in the original information are still present in the encoded version of the image. The PAD image is output at 218. The PAD image 216 can then be transferred and otherwise used like a traditional image file. Additionally, the program stored in the PAD image can be run by the user and/or by other users.

In some implementations, PAD image 216 can consist of a sequence (or a matrix) of pixels, each pixel having a color, which is often represented as 24 bits (8 bits for each red, green, and blue information). In some versions of the encoding process 214 of PAD image 216, the program code 206 and metadata 208 could be encoded in the lower-most bits of the color information, so that the program code and metadata could look like background noise to a human being. In the foreground, using the higher-most bits, the description can be shown. In that case, the description may or may not include the program name. In some cases, the description can be thought of as a human-recognizable representation of the program functions/capabilities 212. In some configurations, the description may be thought of as a human recognizable representation that is an abstraction or summary of the program functions/capabilities. The point of such a configuration is to concisely present germane information to the user in the description so that the user can readily determine whether he/she wants to run the program (e.g., program code 206) contained in PAD image 216.

In other implementations, rather than storing the program code 206 in the color information, the encoding process can generate a PAD image 216 that includes the program code 206 as metadata of the PAD image. The PAD image's color information can be dedicated to (or otherwise utilized for) the presentation of functions/capabilities 212 in the description. For instance, in one such implementation, PAD image 216 could be manifest as a Joint Photographic Experts Group (JPEG) format file and the program code 206 can be manifest as a Exchangeable Image Format (EXIF) tag of the JPEG format file.

Example Technique for Decoding Pad Images

Figure 3:
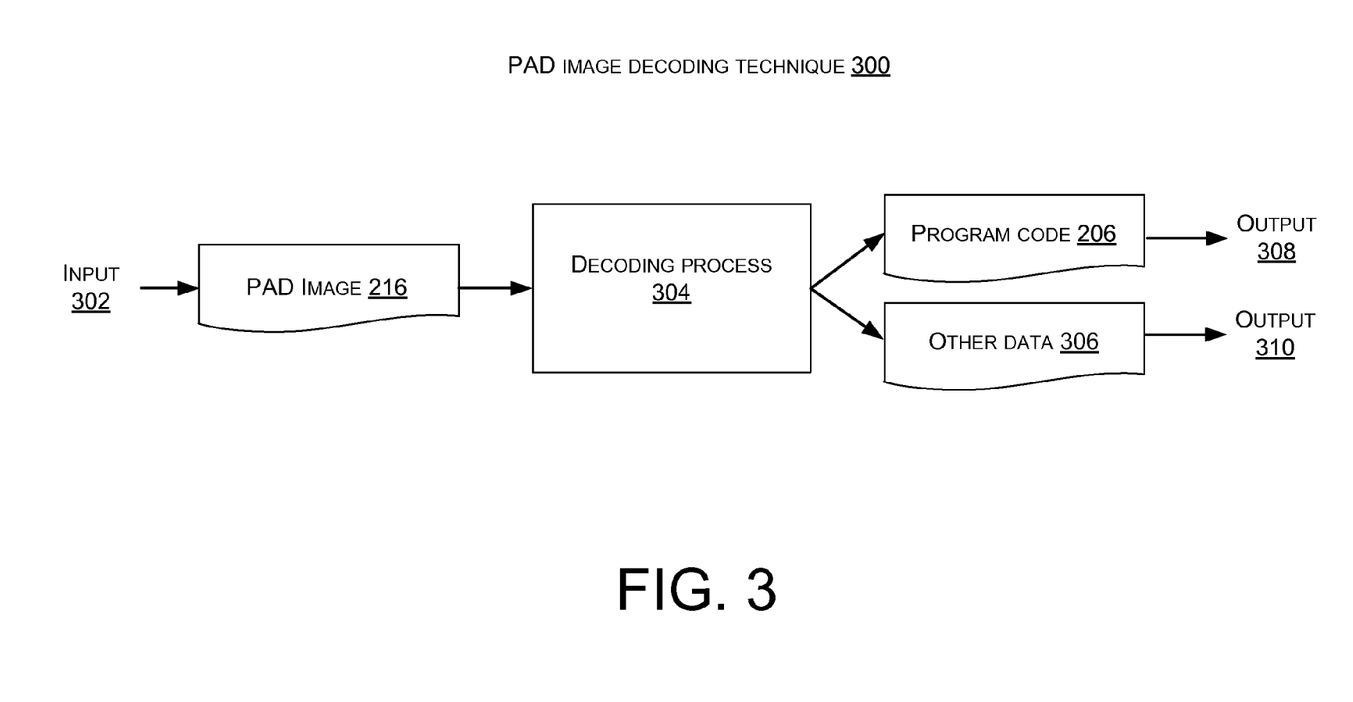

FIG. 3 presents an example PAD image decoding technique 300. Recall that the PAD image can present a representation or description of what the program contained in the PAD image will do. The description can provide a valuable source of information that allows the user to make an informed decision whether he/she wants to run the program. In some instances, based upon the description, the user may decide to run the program contained in the PAD image. The PAD image decoding technique can enable running the program.

This example PAD image decoding technique begins with PAD image 216 as input at 302. The PAD image can be decoded utilizing a decoding process 304. For instance, the low bits of the image data can be extracted, or the EXIF tag can be fetched from the JPEG file. The decoding process can serve to isolate the program code 206 from other data 306. In this case, the other data can include metadata (such as metadata 208 of FIG. 2) and/or the description (e.g., human recognizable representation of the program functions/capabilities (212 of FIG. 2)). The program code 206 can be output at 308. In an instance where the user decides to run or execute the program code, the output 308 provides the program code for execution. The other data 306 can be output at 310 separately from the program code.

Example Technique for Verifying Pad Images

Figure 4:
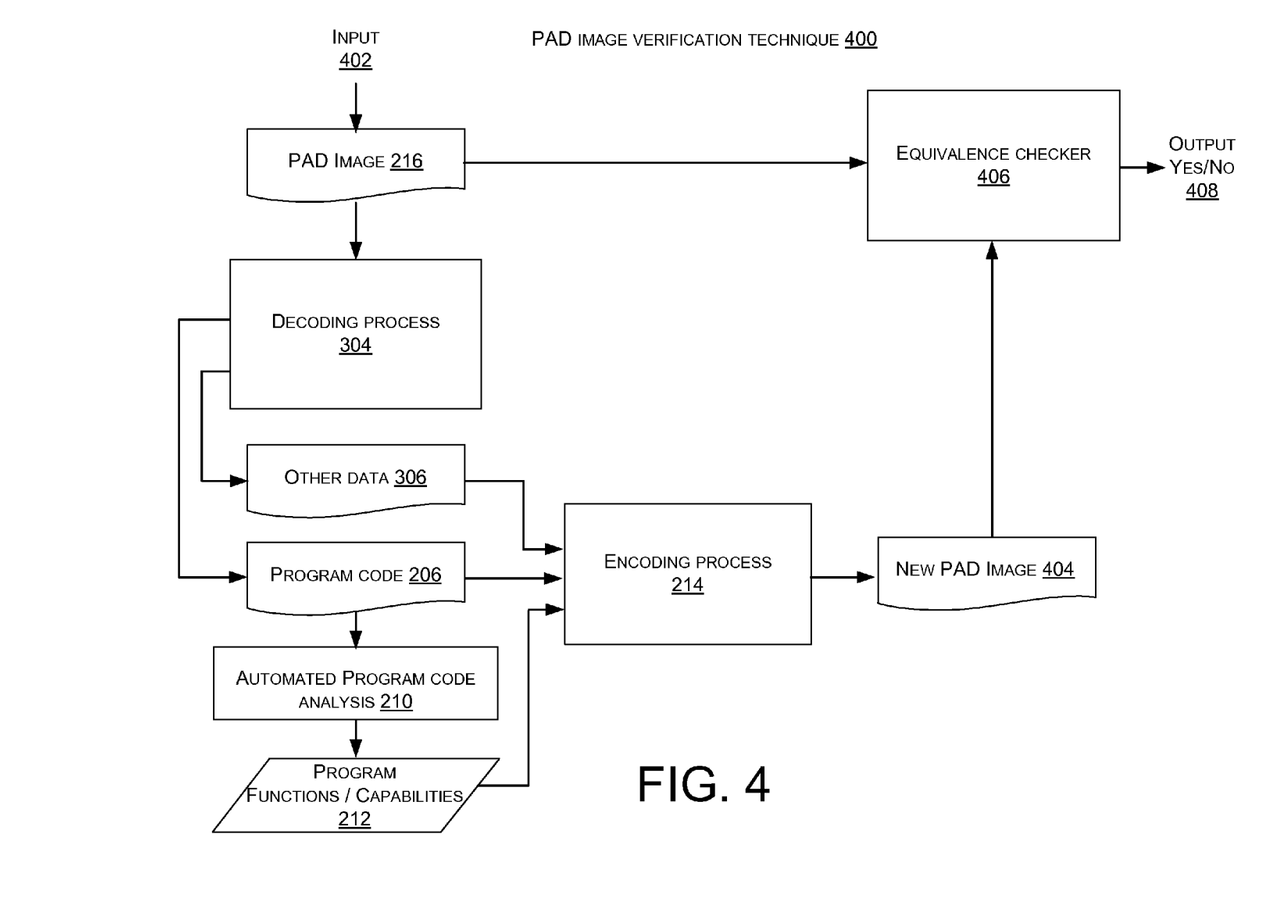

FIG. 4 presents an example PAD image verification or validation technique 400. Recall from the discussion above that a PAD image can include a program that can be run by a user and that the PAD image can also include a description of the program to aid the user in deciding whether to run the program. The PAD image verification techniques offer additional information to the user that can further increase the user's confidence in his/her decision whether to run the program. The PAD image verification techniques can verify that the description or representation of the functionality/capabilities presented with a PAD image actually reflect the included program code. For instance, some cautious (e.g. prudent) users may worry that a nefarious party created the PAD image and generated a description that does not reflect what the program contained in the PAD image actually does. The PAD image verification can enhance the user's confidence that the description presented with the PAD image actually reflects what the program does.

Note that the first portion of the PAD image verification technique can be similar to the PAD image decoding techniques described above relative to FIG. 3. This example of a PAD image decoding technique begins with PAD image 216 as input at 402. The PAD image can be decoded utilizing a decoding process 304. The decoding process can serve to isolate the program code 206 from other data 306.

The next portion of the PAD image verification technique is similar to the PAD image encoding technique described above relative to FIG. 2. At this point, the program code 206 can be analyzed via automated program code analysis 210. The automated program code analysis can generate the program functions/capabilities 212. The other data 306, program code 206 and program functions/capabilities 212 can then be utilized as input to the encoding process 214 to generate a new PAD image 404.

The (original) PAD image 216 and the new PAD image 404 can be sent to an equivalence checker 406. Briefly, if the equivalence checker determines that the original PAD image 216 and the new PAD image 404 are substantially similar (e.g., they match) then the PAD image verification technique can output a "yes" at 408, and if not, the technique can output a "no".

In some implementations, the determination can include a comparison that entails picture synthesis. Briefly, given a program and its name, picture synthesis can be a reversible algorithm, so that by re-running the PAD image encoding process it can be checked if the presented description was tampered with or otherwise inaccurate. Several examples of equivalence checking are described below.

In one case, if the image encoding process is lossless (e.g., PNG), and the image was not resized between initial encoding and verification, then the images should be pixel-identical.

If the encoding is lossy (e.g. JPEG) or the image is resized on the way, the smaller of the two compared images could be first resized to the size of the bigger image. The difference between color values of corresponding pixels of the two images could be computed. Finally, a heuristic could be applied to check that no significant part of the image was significantly altered. For example, if the picture contains text, some implementations could consider an area the size of 25% of the size of a single letter to be significant. If this area contains icons, then the technique could take 25% of a size of a single icon. Then the technique can check that no such significant area was changed by more than 10% of the color value, for example.

Recall that the PAD image 216 includes a representation or description of the functionality/capabilities of the program contained in the PAD image. It is possible that a party could generate a description that did not match the functionality/capabilities. It is also possible that the description is accurate. Recall further, that the program code 206 was separated from the PAD image by the decoding process at 304. This separated program code was analyzed via the automated program code analysis 210 to generate the program's functions/capabilities 212.

If the description in the input or original PAD image 216 was legitimate (e.g., accurate), it should match the description generated in the encoding process from the program functions/capabilities 212. As such, since the functions/capabilities 212 and the program code 206 were utilized to generate the new PAD image 404, the original PAD image 216 and the new PAD image 404 should then match since they are formed from similar content. In contrast, if the description in the input PAD image is an inaccurate description of what the PAD image's program will do and the description generated by encoding process 214 in the new PAD image is accurate, then the input original PAD image 216 will not match the new PAD image 404. As used herein, the input original PAD image 216 and the new PAD image 404 can be deemed to match if they are an exact match or if they share a substantial degree of similarity. For instance, a similarity threshold may be predefined. For purposes of example, assume that the similarity threshold is predefined with a value of 0.9. In such a case, if the equivalence checker identifies the similarity of the input original PAD image 216 and the new PAD image 404 to be 0.9 or higher, then a "yes" is output at 408. If not, a "no" is output at 408.

Predefining the similarity threshold below 1.0 (e.g., an exact match) can offer several potential advantages. First, if a nefarious party misrepresents the functions/capabilities in the original input PAD image 216 and the description created in the encoding process 214 is accurate, the degree of similarity between the new PAD image and the original input PAD image will tend to be quite low. Thus, such a scenario can be properly identified even with the threshold set below 1.0.

Also, setting the similarity threshold lower than 1.0 can avoid erroneously identifying non-equivalence. For instance, the encoding algorithms utilized to create the original input PAD image 216 may be slightly different than those utilized to create the new PAD image 404. The similarity threshold can be set low enough to avoid erroneously indicating a non-match between the two PAD image yet still accurately detect misrepresentations. Lowering the similarity threshold can also allow creative variation to be utilized by the PAD image encoding algorithms for the descriptions. For instance, if the program code of the PAD image accesses the user's list of contacts, a first algorithm might show a graphical text box similar to those shown in FIG. 1 that states "access contacts". Another algorithm might show a contacts icon without text. While not an exact match, accuracy of the PAD image verification process can be enhanced by identifying these two variations as matches.

System Examples

Figure 5:
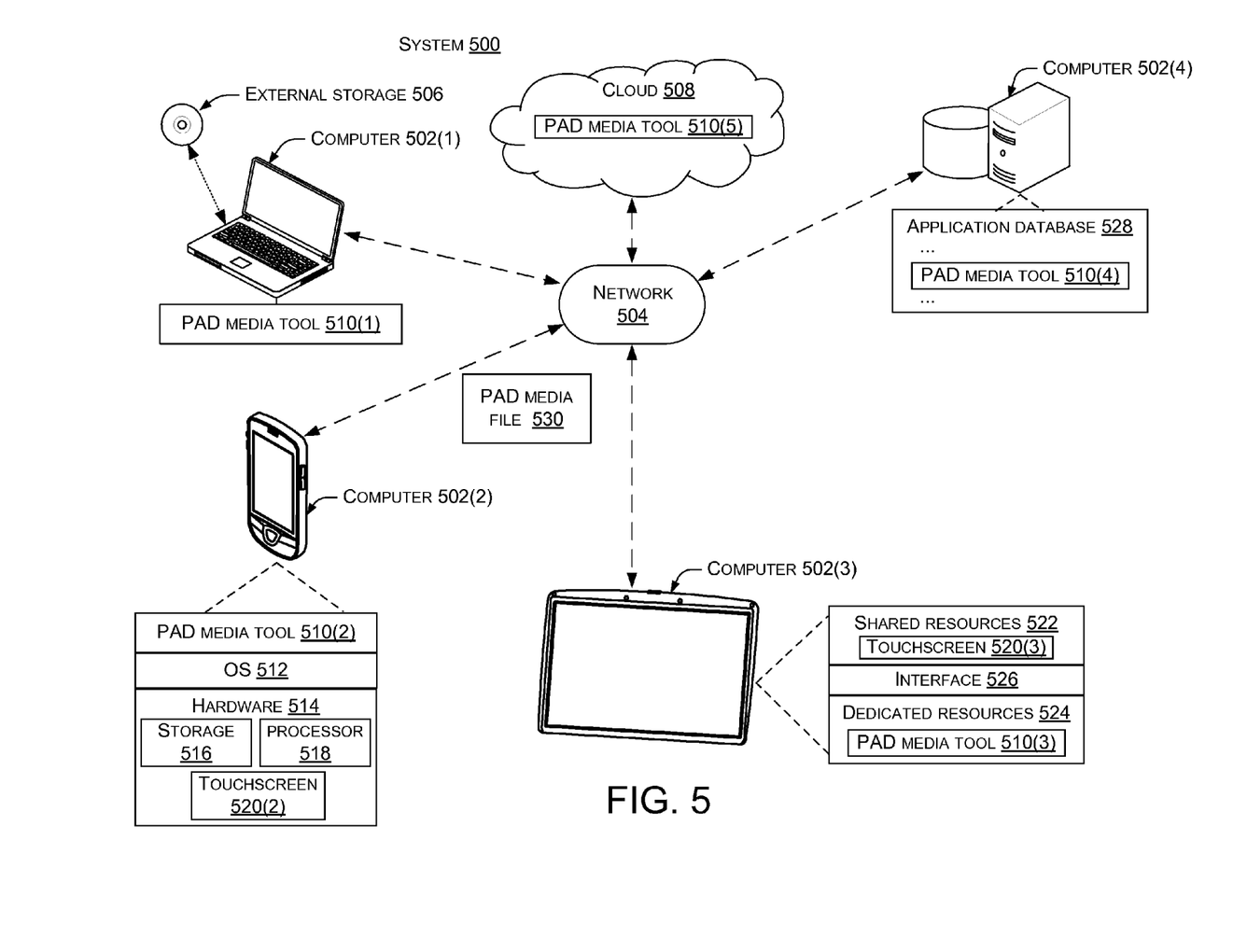
FIG. 5 shows an example of a system that can accomplish PAD media file techniques in accordance with some implementations of the present concepts.

FIG. 5 shows a system 500 upon which PAD image techniques can be implemented. For purposes of explanation, four computing devices or computers 502(1), 502(2), 502(3) and 502(4) are illustrated. In some cases parentheticals are utilized after a reference number to distinguish like elements. Use of the reference number without the associated parenthetical is generic to the element.

In this case, computer 502(1) is manifest as a notebook computer and computer 502(2) is manifest as a smart phone type computer. Computer 502(3) is manifest as a tablet type computer and computer 502(4) is manifest as a desktop computer or server. The term "computer" as used herein can mean any type of device that has some amount of processing capability. While specific examples of such devices are illustrated for purposes of explanation, other examples of such devices can include traditional computing devices, such as personal computers, cell phones, smart phones, personal digital assistants, or any of a myriad of ever-evolving or yet to be developed types of devices. Further, a system can be manifest on a single device or distributed over multiple devices.

Individual computers 502 can exchange data over a network 504. Alternatively or additionally, data may be exchanged directly between two computers, such as via a USB protocol or can be exchanged via a storage media or external storage 506. Individual computers can function in a stand-alone or cooperative manner to achieve PAD image functionalities. For instance, part of a functionality offered on a computer may be performed on the computer and part may be performed on another computer and/or in the cloud 508. As used herein, the cloud 508 refers to computing resources and/or computing functionalities that can be accessed over network 504 though the location of these computing resources may not be readily apparent.

A multitude of different configurations can be created to configure a computer 502 to accomplish PAD image concepts. For instance, individual computers (as well as cloud 508) can include a PAD media tool 510 configured to accomplish some or all of the PAD image concepts on behalf of themselves or at the request of another computer. For purposes of explanation, examples of two possible computer configurations are described below relative to computers 502 (2) and 502(3).

Computer 502(2) includes a PAD media tool 510(2) running on an operating system (OS) 512. The operating system can interact with hardware 514. Examples of hardware can include storage media or storage 516, processor(s) 518, and a touch screen 520(2), among others.

Processor 518 can execute data in the form of computer-readable instructions to provide a functionality, such as a PAD media functionality. Data, such as computer-readable instructions can be stored on storage 516 and/or storage 506. The storage 516 can include any one or more of volatile or non-volatile memory, hard drives, and/or optical storage devices (e.g., CDs, DVDs etc.), among others.

Computers 502 can also be configured to receive and/or generate data in the form of computer-readable instructions from storage 506 that for sake of explanation can be thought of as external storage media. Examples of external storage media can include optical storage devices (e.g., CDs, DVDs etc.), hard drives, and flash storage devices (e.g., memory sticks or memory cards), among others. The computers may also receive data in the form of computer-readable instructions over network 504 that is then stored on the computer for execution by its processor.

Computer 502(3) has a configuration that can be representative of a system on a chip (SOC) type design. In such a case, functionality provided by the computer can be integrated on a single SOC or multiple coupled SOCs. In this case, computer 502(3) includes shared resources 522 and dedicated resources 524. An interface(s) 526 facilitates communication between the shared resources and the dedicated resources. As the name implies, dedicated resources 524 can be thought of as including individual portions that are dedicated to achieving specific functionalities. For instance, in this example, the dedicated resources include PAD tool 510(3). In one case, circuitry on the SOC can be dedicated to the PAD tool 510(3) and other circuitry can be dedicated to other functionalities.

Shared resources 522 can be storage, processing units, etc. that can be used by multiple functionalities. In this example, the shared resources include touch screen 520(3). While in this case, PAD media tool 510(3) is implemented as dedicated resources 524, in other configurations, the tool can be implemented on the shared resources 522 and/or on both the dedicated resources 524 and the shared resources 522.

Generally, any of the functions described herein can be implemented using software, firmware, hardware (e.g., fixed-logic circuitry), manual processing, or a combination of these implementations. The terms "tool", "component", or "module" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

As used herein, the term "computer-readable media" can include transitory and non-transitory instructions. In contrast, the term "computer-readable storage media" excludes transitory instances. Computer-readable storage media can include "computer-readable storage devices". Examples of computer-readable storage devices include volatile storage media, such as RAM, and non-volatile storage media, such as hard drives, optical discs, and flash memory, among others.

Figure 6:
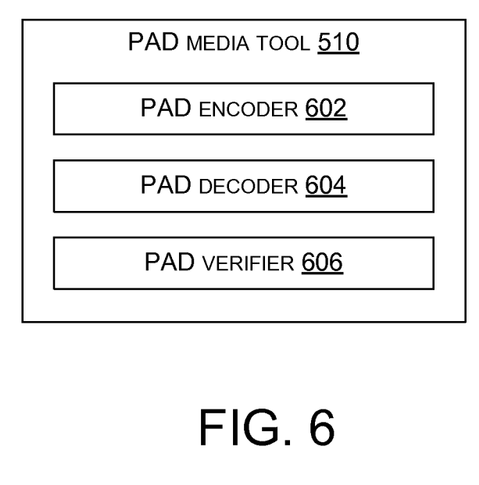
FIG. 6 shows some of the elements of the system of FIG. 5 in greater detail.

FIG. 6 shows one example of a PAD media tool 510. In this case, the PAD media tool can include a PAD encoder module 602, a PAD decoder module 604, and a PAD verifier module 606.

PAD encoder module 602 can be configured to encode PAD media files, such as PAD image files, PAD audio files, and/or PAD video files. For instance, the PAD encoder module can be configured to receive a program and to analyze the program to determine its functionality/capabilities. The PAD encoder module can then form a PAD media file such that the functionality/capabilities are represented in or with the PAD media file in a human-understandable form and the program is stored in or with the PAD media file. The program may be stored in a human-understandable form or may be stored in a manner that is not readily recognizable or even noticeable to the user. Some implementations of the PAD encoder module can perform the PAD image encoding technique described above relative to FIG. 2 for encoding PAD image files. These implementations can perform similar techniques for audio and video PAD media files.

PAD decoder module 604 can be configured to decode PAD media files. For instance, the PAD decoder module can be configured to act upon a PAD media file to separate a program associated with the PAD media file from other data associated with the media file. The separated program can then be run as desired by the user.

PAD verifier module 606 can be configured to verify that a representation or description associated with a PAD media file matches a program associated with the PAD media file. Some implementations of the PAD verifier module can be configured to perform the PAD image verification technique described above relative to FIG. 4. The PAD verifier module can perform similar verification techniques for other forms of PAD media files, such as PAD audio files and/or PAD video files.

Returning now to FIG. 5, the various PAD media tools can be acquired in various ways. For instance, the PAD media tool can be pre-installed on the computer by a manufacturer or an intermediary that prepares and/or sells the computer to an end user (e.g., customer). In other scenario, the PAD media tool may be available for installation by the end user. For instance, the user could obtain the PAD media tool on external storage 506 and install the PAD media tool on the computer. In another scenario, the user may obtain the PAD media tool from a network source, such as application database 528 associated with computer 502(4). The application database may alternatively or additionally occur on cloud 508. The source of the PAD media tool can influence the user's degree of trust in any PAD media file techniques performed by the PAD media tool. For instance, assume that the user of computer 502(2) receives PAD media file 530 and that the user has PAD media tool 510(2) perform a verification on the PAD media file. The user's trust in the PAD media tool can influence the user's confidence in the verification result. For example, if PAD media tool 510(2) was installed by the manufacturer of computer 502(2) the user's confidence in the resultant verification would tend to be high since the manufacturer tends to be a trusted source. On the other extreme if the user received the PAD media file 530 and PAD media tool 510(2) from the same source, then verification performed by the PAD media tool may be less trusted since a nefarious party may have manipulated both to hide what a program in the media file actually does.

Further Pad Media File Method Example

Figure 7:
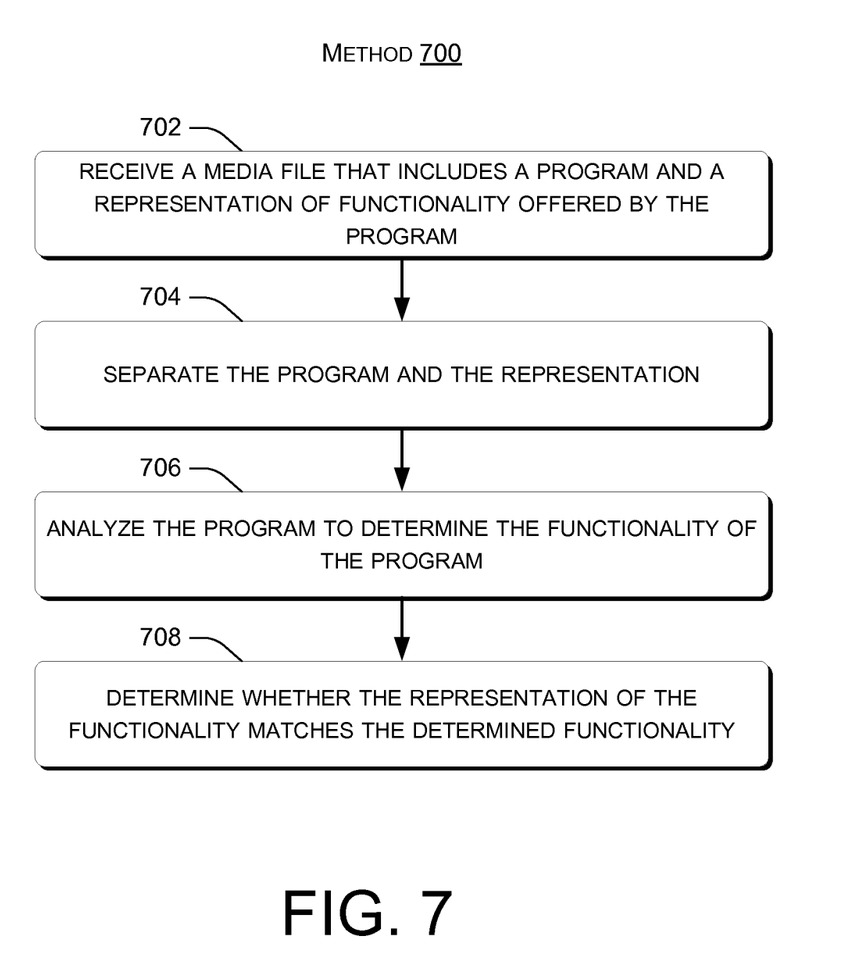
FIG. 7 shows a flowchart of an example of another PAD media file technique in accordance with some implementations of the present concepts.

FIG. 7 illustrates a flowchart of a technique or method 700 that is consistent with at least some implementations of the present concepts.

At block 702, the method can receive a media file that includes a program and a representation of functionality offered by the program.

At block 704, the method can separate the program and the representation.

At block 706, the method can analyze the program to determine the functionality of the program.

At block 708, the method can determine whether the representation of the functionality matches the determined functionality.

The order in which the above-mentioned methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

CONCLUSION

Although techniques, methods, devices, systems, etc., pertaining to PAD media file scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-readable storage media having instructions stored thereon that when executed by a computing device cause the computing device to perform acts, comprising:
   receiving metadata and executable code, the metadata being associated with the executable code;
   determining a functionality is performed by execution of the executable code, wherein the functionality is determined without executing the executable code; and
   creating a media file using original bits of the executable code and the metadata, wherein the media file presents the functionality in a form that is human-understandable without executing the executable code, wherein the creating comprises encoding the original bits into a new bit stream of the media file.

2. The computer-readable storage media of claim 1, wherein the receiving comprises enabling a user to create the executable code.

3. The computer-readable storage media of claim 1, wherein the receiving comprises allowing a user to specify a location from which the executable code is obtainable.

4. The computer-readable storage media of claim 1, wherein the receiving comprises generating a graphical user interface from which a user defines the executable code.

5. The computer-readable storage media of claim 1, wherein the creating the media file comprises creating an image file that presents the functionality by displaying one or more graphical text boxes.

6. The computer-readable storage media of claim 1, wherein the creating the media file comprises creating an image file that presents the functionality by displaying one or more icons.

7. The computer-readable storage media of claim 1, wherein the creating the media file comprises creating a video file that visually presents the functionality.

8. The computer-readable storage media of claim 1, wherein the creating the media file comprises creating an audio file that audibly presents the functionality.

9. A method implemented by one or more computing devices, the method comprising:
   obtaining an image that includes executable code, metadata, and an abstraction of a functionality is performed by execution of the executable code, wherein the abstraction is configured to be presented over the executable code when the image is displayed without executing the executable code; and
   identifying the executable code from the image without executing the executable code, the identifying comprising:
      decoding the image to separate the executable code and the metadata,
      analyzing the executable code to determine an actual functionality of the executable code, and
      determining whether the abstraction of the functionality matches the determined actual functionality by determining whether a similarity between the abstraction and the determined actual functionality is greater than a similarity threshold.

10. The method of claim 9, wherein the image comprises one or more images of a video file.

11. The method of claim 9, wherein the obtaining comprises receiving the image on a smart phone and wherein the identifying is performed by the smart phone.

12. The method of claim 9, further comprising, in an instance where the similarity is greater than the similarity threshold, outputting the executable code for execution.

13. The method of claim 12, wherein the decoding comprises isolating the executable code from the abstraction.

14. A computer-readable storage media having instructions stored thereon that when executed by a processor cause the processor to perform a method, comprising:
   receiving a media file that includes a program and a representation of a functionality offered by the program, wherein the representation of the functionality is human-recognizable without executing the program; and
   processing the media file without executing the program, the processing comprising:
      separating the program and the representation by decoding the media file,
      analyzing the program to determine an actual functionality of the program, and
      determining whether the representation of the functionality matches the determined actual functionality by determining whether a similarity between the representation and the determined actual functionality is greater than a predefined threshold.

15. The computer-readable storage media of claim 14, embodied on a single computing device.

16. The computer-readable storage media of claim 14, embodied on a compact disc.

17. The computer-readable storage media of claim 14, the separating further comprising separating the program and metadata associated with the program.

18. The computer-readable storage media of claim 17, the processing further comprising encoding the separated program, the actual functionality of the program, and the separated metadata into a new media file.

19. The computer-readable storage media of claim 18, the processing further comprising determining the similarity by comparing the media file and the new media file.

20. The computer-readable storage media of claim 14, the processing further comprising outputting an indication of whether the similarity is greater than the predefined threshold.

\* \* \* \* \*